(No Model.)
S. P. STILLMAN.
FIFTH WHEEL.
No. 324,965. Patented Aug. 25, 1885.
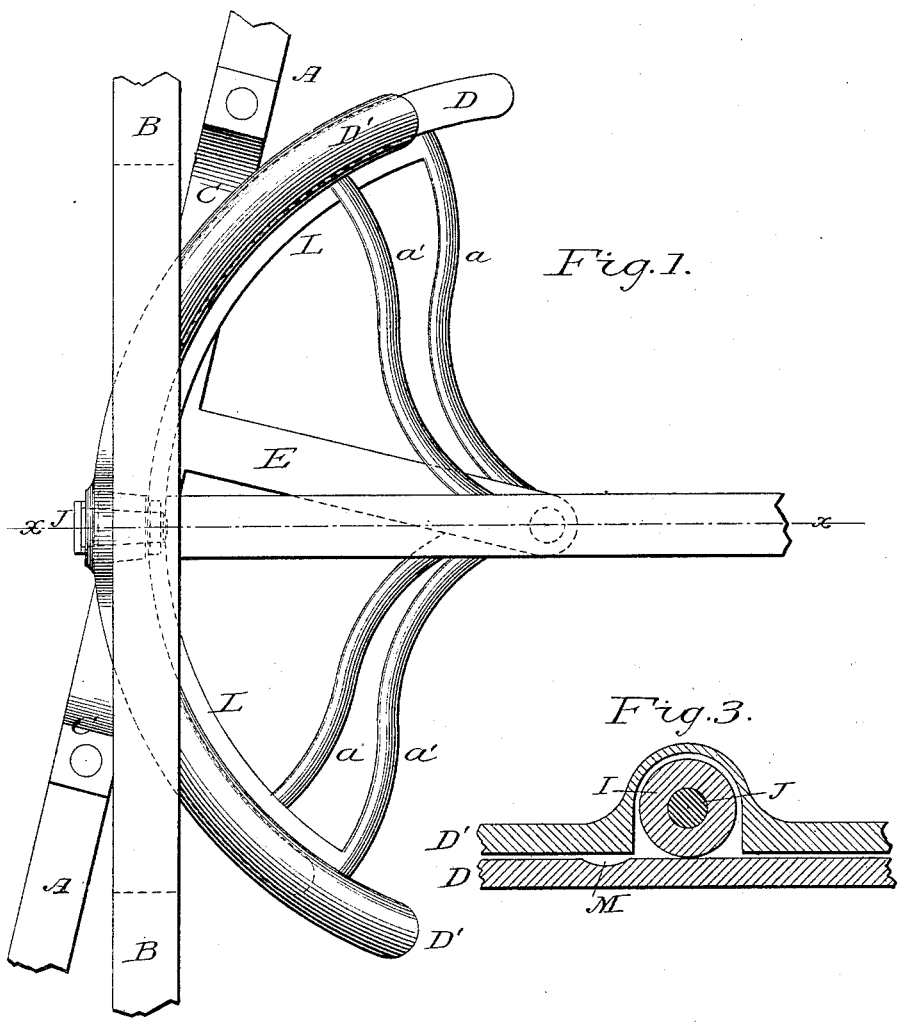
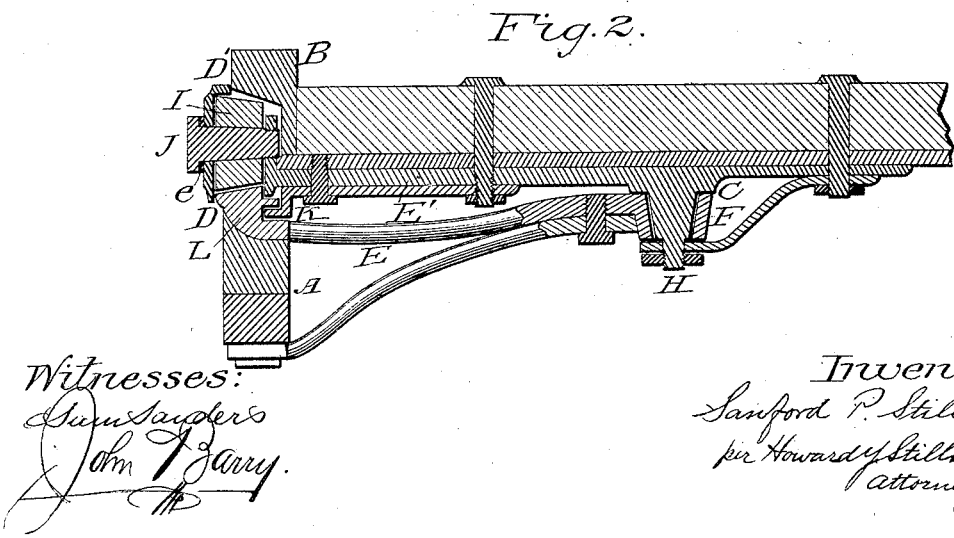
Witnesses:
Sam Sanders
John J. Barry
Inventor:
Sanford P. Stillman,
per Howard J. Stillman,
Attorney.

United States Patent Office.

SANFORD P. STILLMAN, OF WESTERLY, RHODE ISLAND.

FIFTH-WHEEL.

SPECIFICATION forming part of Letters Patent No. 324,965, dated August 25, 1885.

Application filed April 14, 1883. (No model.)

*To all whom it may concern:*

Be it known that I, SANFORD P. STILLMAN, a citizen of the United States, residing at Westerly, in the county of Washington and State of Rhode Island, have invented a new and Improved Fifth-Wheel, of which the following is a specification.

My invention consists of a segmental plate firmly connected with the axle, and swinging by means of the perforated end of a center bar extending backward upon a slightly-tapering pivot attached to the center bar of a corresponding segmental plate connected with the rocker. Attached to the upper plate is a friction-roller which, when the axle and rocker are parallel, fits into a groove in the lower plate, the said plates being firmly held together by means of a flange and clutch.

The object of my invention is to furnish an improved fifth-wheel for vehicles of all kinds, by which the vehicle may be turned more easily, in less space, and more convenient manner, without the use of a king-bolt, forming a more durable, stronger, and neater method of connecting axle and rocker than those heretofore in use, and also to prevent the vibratory motion of the shafts or pole.

In the accompanying drawings, Figure 1 is a top view; Fig. 2, a vertical section on the line $x\,x$, and Fig. 3 a detail vertical section showing the roller and groove.

Similar letters of reference indicate similar parts throughout the several views.

In the drawings, A represents the axle, and B the rocker to which my improved fifth-wheel construction is applied. On the axle is fastened, by means of the arms C C, the segmental plate D, which has a center bar E extending backward and ending in a perforated sleeve, F, by which it is made to swing upon the pivot H of the center bar E' of the upper plate. The supporting-plate D is fitted to a shallow groove in the corresponding plate, D', which is attached to the rocker by means of arms similar to C C, and to the under side of the reach by the center bar E'. The plates are connected at their ends with their respective center-bars by means of the brace-rods $a\,a\,a'\,a'$.

The center pivot, H, is made slightly tapering, with a shoulder, $c$, at the base, so that as the pivot grows smaller by wear the shoulder will likewise grow shorter and allow the perforated sleeve to come up nearer to the base of the pivot, thus preventing the joint from becoming loose and rattling. If the shoulder does not wear fast enough, it may be filed a little from time to time; if too fast, a washer may be inserted.

On the inner edge of the plate D is the flange L, bearing upon the clutch K, which is bolted or otherwise fastened to the center bar E', thus producing a firm connection between the upper and lower plates. The clutch K is an improvement on the projection of the center bar, which is old.

To the upper plate is fastened a friction-roller, I, which serves to take up the friction between the two plates and facilitates the turning of the vehicle. The roller I revolves upon the tapering pivot J, beneath the head of which is the washer $e$, which may be removed or replaced by a thinner one when the pivot becomes worn, and thus tighten the joint, as in the case of the center pivot, H.

In the lower plate is the transverse groove M, in which, when the axle and rocker are parallel, fits the roller I, so that the vehicle can be turned only by first exerting a force sufficient to raise the superimposed weight from the bottom to the edge of the groove, thus preventing the vibratory motion of the shafts or pole, and the consequent constant wear of the plates in vehicles when passing over paved or other uneven roads.

It is not necessary that the fifth-wheel should be constructed exactly as described. Thus the roller I, the clutch K, or the pivot H may be attached to the lower plate and the corresponding groove, M, flange L, or perforated sleeve F to the upper plate. The lower plate may swing on a bolt passing through the upper plate instead of on the pivot H. The groove M may be used in combination with the various kinds of friction-rollers. Washers may be used instead of the shoulder $c$ of the pivot H.

Having thus described my invention, I claim as new and desire to secure by Letters Patent—

The combination of the plates D D', the pivot H, the friction-roller I, and the groove M.

SANFORD P. STILLMAN. [L.S.]

Witnesses:
EVERETT BARNS,
HENRY BRYANT.